(12) United States Patent
Hiltner et al.

(10) Patent No.: US 8,778,245 B2
(45) Date of Patent: Jul. 15, 2014

(54) AXIALLY ORIENTED CONFINED CRYSTALLIZATION MULTILAYER FILMS

(75) Inventors: Anne Hiltner, Cleveland, OH (US); Eric Baer, Cleveland Heights, OH (US); Yijian Lin, Lake Jackson, TX (US); Joel Carr, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 566 days.

(21) Appl. No.: 13/087,828

(22) Filed: Apr. 15, 2011

(65) Prior Publication Data

US 2011/0241245 A1  Oct. 6, 2011

Related U.S. Application Data

(63) Continuation-in-part of application No. 12/631,964, filed on Dec. 7, 2009.

(60) Provisional application No. 61/120,140, filed on Dec. 5, 2008, provisional application No. 61/324,609, filed on Apr. 15, 2010.

(51) Int. Cl.
*B29C 55/00* (2006.01)

(52) U.S. Cl.
USPC .................................................. 264/173.15

(58) Field of Classification Search
USPC .................................................. 264/173.15
See application file for complete search history.

(56) References Cited

PUBLICATIONS

"Confined Crystallization of Polyethylene Oxide in Nanolayer Assemblies" to Wang et al. (Science, vol. 323 p. 757-760, Feb. 6, 2009).*

* cited by examiner

*Primary Examiner* — Joseph S Del Sole
*Assistant Examiner* — John Robitaille
(74) *Attorney, Agent, or Firm* — Tarolli, Sundheim, Covell & Tummino LLP

(57) ABSTRACT

A method of forming a confined crystallization multilayer film includes coextruding a plurality of first polymer layers and a plurality of second polymer layer to form a multilayer film wherein each first polymer layer is sandwiched between second polymer layers and axially orienting the multilayer film at a temperature below the melting temperature ($T_m$) of the second polymer layer and to a thickness such that each first polymer layer forms a high aspect ratio substantially crystalline lamellae.

33 Claims, 6 Drawing Sheets

Flat-on PEO lamellae were found in the final BOPP films

AXIALLY ORIENTED CONFINED CRYSTALLIZATION MULTILAYER FILMS

RELATED APPLICATION

This application is related to U.S. Provisional Application No. 61/324,609, filed Apr. 5, 2010, and is a continuation in part of U.S. patent application Ser. No. 12/631,964, filed Dec. 7, 2009, which claims priority U.S. Provisional Application No. 61/120,140, filed Dec. 5, 2008, the subject matter of both applications which are incorporated herein by reference in their entirety.

GOVERNMENT FUNDING

This application was made with government support under Grant No. DMR0423914 awarded by The National Science Foundation. The United States government has certain rights in the invention.

TECHNICAL FIELD

This application is directed to a multilayer film and, in particular, to a method and apparatus for forming a multilayer film that includes a confined crystallization layer.

BACKGROUND

The rapid development of nanoscience and nanotechnology is driving an interest in ultra-thin polymer layers with highly controlled and selective gas barrier properties. New packaging strategies that utilize the unique gas transport characteristics of nanolayers could significantly address growing environmental and energy concerns. Considering the magnitude of the need, packaging with enhanced gas barrier and selectively could dramatically reduce the amount of food waste, thereby reducing world hunger, greenhouse gas generation and the load on global water and energy supplies (A. L. Brody, Food Technology 62(6), 121 (2008)).

Crystallization is a common approach for reducing gas permeability of polymers in the bulk (D. H. Weinkauf, D. R. Paul, in Barrier Polymers and Structures, W. J. Koros. Ed. American Chemical Society, Washington, D.C. 1990), pp. 60-91.). Crystallization is a self-organization process through which molecules are arranged in a regular order (M. D. Ward, Science 308, 1566-1567 (2005)). It is fundamental to the structural characteristics and the physicochemical properties of many substances, including inorganic materials, small organic molecules, synthetic polymers and biomacromolecules (V. Cherezov, D. M. Rosenbaum, M. A. Hanson, S. G. F. Rasmussen, F. S. Thian. T. S. Kobilka, H. J. Choi, P. Kuhn, W. J. Weis. B. K. Kobilka. R. C. Stevens, Science 318, 1258-1265 (2007); S. G. F. Rasmussen, H. J. Choi, D. M. Rosenbaum. T. S. Kobilka. F. S. Thian, P. C. Edwards, M. Burghammer, V. R. P. Ratnala, R. Sanishvili, R. F. Fischetti, G. F. X. Schertler, W. J. Weis, B. K. Kobilka. Nature 450, 383-U384 (2007)).

The two-dimensional crystallization of polymers is conventionally studied with polymeric thin films or block copolymers that contain at least one crystallizable block. In the former, crystallizable layers with nanometer to submicron thicknesses are prepared by a solution process such as Langmuir-Blodgett, spin-coating techniques. These approaches are limited by the solvent requirement and by the small amount of material that can be fabricated. In the latter, a lamellar phase morphology on the length scale of a few tens of nanometers can be achieved as a consequence of microphase separation of the dissimilar blocks below the order-disorder transition temperature (TODT) (F. S. Bates, G. H. Fredrickson, Annual Review of Physical Chemistry 41, 525-557 (1990)). Shear-alignment is often necessary to construct well-defined layering with a uniformly oriented, micron-scale phase morphology (Z.-R. Chen, J. A. Kornfield, S. D. Smith, J. T. Grothaus, M. M. Satkowski Science 277, 1248-1253 (1997)).

SUMMARY

This application relates to a confined crystallization multilayer film that is substantially impermeable to gas or water vapor diffusion. The confined crystallization multilayer film includes a first polymer layer that defines a high aspect ratio crystalline lamellae confined between second polymer layers. The high aspect ratio crystalline lamellae can be formed by axial orientation or stretching of the multilayer film to a thickness effective to induce formation of the high aspect ratio crystalline lamellae.

The application also relates to a method of forming a confined crystallization multilayer film. The method includes providing a multilayer film that has a plurality of first polymer layers and a plurality of second polymer layers wherein each first polymer layer is sandwiched between second polymer layers. The first polymer layers can have a melting temperature ($_{Tm}$) below the melting temperature ($_{Tm}$) of the second polymer layers. The multilayer film can then be axially oriented below the melting temperature ($T_m$) of the second polymer layer and to a thickness such that each first polymer layer forms a high aspect ratio substantially crystalline lamellae.

In an aspect of the application, the first polymer layers and the second polymer layers can be coextruded to form the multilayer film. The multilayer film can then be biaxially oriented substantially parallel to a plane in which the film extends after coextrusion.

In another aspect of the application, the first polymer layers can include a first polymer selected from the group consisting of high-density polyethylene, polyethylene oxide, polyamide, polyester, polycaprolactone, polyvinylidene fluoride, polytetrafluoroethylene, polyvinylidene, copolymers thereof, and combinations thereof. The second polymer layers can include a second polymer selected from the group consisting of polypropylene, polystyrene, maleic anhydride-modified polypropylene (PPgMA), PET, polycarbonate, acrylics/methacrylics, polyesters, polyurethanes, polyamides, polyimides, polyphosphazenes, epoxy resins, hybrid polyester polymers, nylon, low-density polyethylene, polyoxymethylene, copolymers thereof, and combinations thereof.

In a further aspect of the application, the first polymer layers can each be axially oriented to a thickness that is effective to promote crystallization of the first polymer layers. For example, each first polymer layer can be drawn or stretched to an average thickness of about 10 nm to about 500 nm. The aspect ratio of the substantially crystalline lamellae can be at least about 5, for example, at least about 10 to about 1000. The multilayer film can be drawn at a draw ratio of about 3:3 to about 5:5.

In another aspect of the application, the multilayer film can be axially oriented at a temperature above the melting temperature ($T_m$) of the first polymer layers and below the melting temperature ($T_m$) of the second polymer layers and to a thickness such that each first polymer layer forms a high aspect ratio substantially crystalline lamellae.

In a further aspect of the application, the multilayer film can axially oriented at a temperature at or below the melting temperature ($T_m$) of first polymer layers and between the glass transition temperature ($T_g$) and the cold crystallization temperature ($T_{cc}$) of the second polymer layers. The first polymer layers can then be melt recrystallized after axially orientation to reduce gas permeability of the multilayer film.

DETAILED DESCRIPTION

This application relates to a multilayer film that includes at least one confined crystallization layer. The confined crystallization layer(s) can be formed by axially orienting a multilayer film that includes a plurality of first polymer layers of a first crystallizable polymer material confined between second polymer layers of a second polymer material. Unexpectedly, it was found that the morphology of the first polymer layers changes as they are made progressively thinner by axially orienting (e.g., biaxially stretching or drawing process) the film. At thicknesses on a nano-scale level (e.g., about 5 nm to about 500 nm), each first polymer layer, as a result of the reduced thickness and forced confinement between the second polymer layers, can crystallize as a high aspect ratio lamellae that resembles single large, impermeable crystals.

The resulting multilayer film with confined crystallization layers can be substantially impermeable to gas and/or water vapor diffusion and provide barrier properties that allow the multilayer film to be used in applications where selective diffusion of gases is desired. Such applications can include, for example, food packaging applications where it is desirable to prevent oxygen from diffusing into the package and carbon dioxide or water vapor from diffusing out of the package, bladders for tubes or bellows, medical applications, as well as electronic display applications where it is desirable to prevent diffusion of gas.

Figure 1:
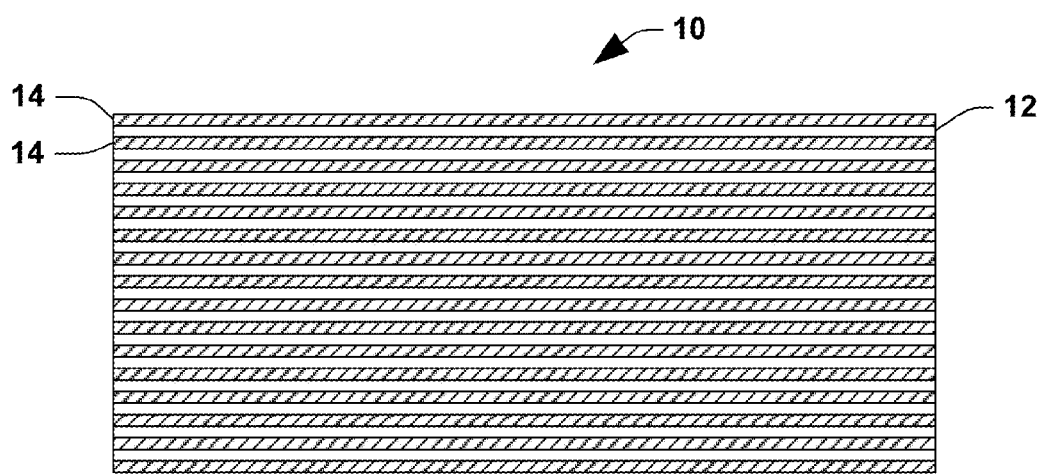
FIG. 1 illustrates a schematic view of a multilayer film in accordance with an aspect of the application.

FIG. 1 is a schematic illustration of a confined crystallization multilayer film 10 in accordance with an aspect of the application. The multilayer film 10 in this aspect comprises alternating first crystallization polymer layers 12 and second polymer layers 14. The second polymer layers 14 confine or sandwich each first crystallization polymer layers 12. Each first polymer layer can include a high aspect ratio lamellae that is continuous and extends substantially parallel to the first layers and the second layers. By "high aspect ratio", it is meant an aspect ratio of at least about 5, for example, at least about 100. In some aspects of the invention, the aspect ratio of the substantially crystalline lamellae can be about 10 to about 1000. In other aspects of the invention, the aspect ratio of the substantially crystalline lamellae can be about 100 to about 150.

The first polymer material used to form the confined first crystallization layers can include any thermoplastic or thermoformable polymer material that can be readily axially oriented (e.g., stretched or drawn) and form crystals upon confinement between the second polymer layers. Examples of polymers that can be used as the first polymer are high-density polyethylene, polyethylene oxide, polyamide, polyester, polycaprolactone, polyvinylidene fluoride, polytetrafluoroethylene, polyvinylidene, copolymers thereof, and combinations thereof.

In one example, the polymeric material used to form the confined first crystallization polymer layers can be polyethylene oxide. It was found that biaxially oriented layers of polyethylene oxide having an average thickness of about 10 nm to about 300 nm that are confined between polypropylene or maleic anhydride modified polypropylene PPgMA can crystallize as single, high aspect ratio (e.g., an aspect ratio of at least about 120) lamellae that resemble single large, impermeable crystals.

In another example, the polymeric material used to form the confined first crystallization polymer layers can be a copolymer of polyvinylidene fluoride and polytetrafluoroethylene film (e.g., PVDF-TFE). It was found that biaxially oriented and melt recrystallized layers of PVDF-TFE having an average thickness of about 10 nm to about 300 nm that are confined between polyethylene terephthalate (PET) can crystallize as single, high aspect ratio (e.g., an aspect ratio of at least about 120) lamellae that resemble single large, impermeable crystals.

The second polymer material that is used to form the second polymer layers, which confine the first polymer layers, can include any thermoplastic or thermoformable polymer material that has a melting temperature ($T_m$) higher than the melting temperature ($T_m$) of the first polymer material and that can be readily coextruded with the first polymer material. In an aspect of the invention, the second polymer can include those thermoplastic or thermoformable polymers that are immiscible or partially miscible with the first polymer upon coextrusion. In another aspect of the invention, the second polymer can comprise a polymer that solidifies at a higher temperature than the first polymer to provide confinement of the first polymer layers. Examples of polymer material that can be used as the second polymer material, include polypropylene, maleic anhydride-modified polypropylene (PPgMA), polyethylene naphthalate and isomers thereof, such as 2,6-, 1,4-, 1,5-, 2,7-, and 2,3-polyethylene naphthalate; polyalkylene terephthalates, such as polyethylene terephthalate (PET), polybutylene terephthalate, and poly-1,4-cyclohexanedimethylene terephthalate; polyimides such as polyacrylic imides; polyetherimides; styrenic polymers, such as atactic, isotactic and syndiotactic polystyrene, α-methyl-polystyrene, para-methyl-polystyrene; polycarbonates, such as bisphenol-A-polycarbonate (PC); polycaprolactone; poly(meth)acrylates such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); ethylene/acrylic acid copolymers; cellulose derivatives such as ethyl cellulose, cellulose acetate, cellulose propionate, cellulose acetate butyrate, and cellulose nitrate; polyalkylene polymers, such as polyethylene, polypropylene, polybutylene, polyisobutylene, and poly(4-methyl)pentene; fluorinated polymers such as perfluoroalkoxy resins, polytetrafluoroethylene, fluorinated ethylenepropylene copolymers, polyvinylidene fluoride, and polychlorotrifluoroethylene; chlorinated polymers such as polydichlorostyrene, polyvinylidene chloride and polyvinylchloride; polysulfones; polyethersulfones; polyacrylonitrile; polyamides; polyvinylacetate; polyetheramides. Copolymers can also be used and include, for example, styrene-acrylonitrile copolymer (SAN), containing between 10 and 50 wt %, preferably between 20 and 40 wt %, acrylonitrile, styrene-ethylene copolymer; and poly(ethylene-1,4-cyclohexylene-dimethylene terephthalate) (PETG). In addition, the second layers can include blends of two or more of the above-described polymers or copolymers. In an aspect of the invention, the second polymer can be selected from the group consisting of polystyrene, polycarbonate, polymethylmethacrylate, low-density polyethylene, polyamides, ethylene-co-acrylic acid, and polyoxymethylene The confined crystallization multilayer film can be fabricated using these materials by first coextruding the first polymer material and the second polymer material. Coextrusion of the first polymer material and the second polymer material can yield a flexible large film or sheet of multilayer structure including first polymer layers confined between second polymer layers. After coextrusion the multilayer film can be axially oriented, by for example, biaxially stretching, at a temperature below the melting temperature ($T_m$) of the second polymer layer and to a thickness such that each first polymer layer can crystallize as a high aspect ratio substantially crystalline lamellae. By substantially crystalline lamellae, it is meant that each first polymer layer is at least about 40% crystalline, at least about 50% crystalline, at least about 60% crystalline, at least about 70% crystalline, at least about 80% crystalline, at least about 90% crystalline, at least about 95% crystalline, or at least about 99% crystalline. This thickness can be on a nano-scale level and be, for example, from about 5 nanometers to about 1000 nanometers, from about 10 nanometers to about 500 nanometers, or from about 10 nanometers to about 20 nanometers. The thickness of each first layer will depend on the individual polymer material used form the first layers and can be readily selected to optimize crystallization properties (i.e., formation of high aspect ratio lamellae). In an aspect of the invention, the thicknesses of the first polymer layers should be such that a high aspect ratio crystalline lamellae is formed for each first polymer layer but not so thin that the first polymer layers readily break-up or fracture upon axial orientation or after confinement.

Crystals are generally considered to be impermeable to small gas molecules, and gas transport is seen as occurring through the amorphous regions of the polymer. As the confined layer thickness of a multilayer film including, for example, polyethylene oxide confined layers, is reduced, crystallinity of the confined layers increase, and permeability of the confined layer decreases. Reduction in thickness and crystallization in a confined space resulted in an unusual crystalline morphology that endowed the confined layers with exquisitely low gas or water vapor permeability.

The thickness of the individual second layers used to confine the first layers can be on a nano-scale level. The thicknesses of these layers can be, for example, from about 5 nanometers to about 1000 nanometers, from about 10 nanometers to about 100 nanometers, or from about 10 nanometers to about 20 nanometers.

In an aspect of the application, the multilayer film can be axially oriented at a temperature above the melting temperature ($T_m$) of the first polymer layers and below the melting temperature ($T_m$) of the second polymer layers and to a thickness such that each first polymer layer can crystallize as a high aspect ratio substantially crystalline lamellae.

In another aspect of the application, the multilayer film can axially oriented at a temperature at or below the melting temperature ($T_m$) of first polymer layers and between the glass transition temperature ($T_g$) and the cold crystallization temperature ($T_{cc}$) of the second polymer layers. The first polymer layers can then be melt recrystallized after axially orientation to reduce gas permeability of the multilayer film. By "melt recrystallized", it is meant that the first polymer layers are heated above the melting temperature ($T_m$) of the first polymer layers, and preferably, below the melting temperature ($T_m$) of the second polymer layer, for a time effective to allow the substantially crystalline lamellae to melt and then recrystallize below the melting temperature of the first polymer layers to reorient the substantially crystalline lamellae such that the substantially crystalline lamellae of the first polymer layers extends in a plane substantially parallel to the multilayer film and has the aspect ratio at least about 5. Unexpectedly, it was found that melt recrystallization of the first polymer layers substantially decreases the gas permeability and water permeability following axial orientation.

In another aspect of the application, the multilayer film can made of two alternating layers (ABABA . . . ) of the first polymer material referred to as component "(a)" and a second polymer material referred to as component "(b)". The components (a) and (b), may be the same or different and form a multilayer structure represented by formula $(AB)_x$, where $x=(2)n$, and n is the number of multiplier elements. At least one of components (a) and (b) comprises a crystallizable polymer. It should be understood that the multilayer structure of the invention may include additional types of layers. For example, these other layers can include tie layers, adhesive layers, and/or other polymer layers. The components of the various alternating layers may be the same or different as long as at least one component includes a crystallizable polymer. For instance, a three component structure of alternating layers (ABCABCA . . . ) of components (a), (b) and (c) is represented by (ABC)x, where x is as defined above.

Figure 2:
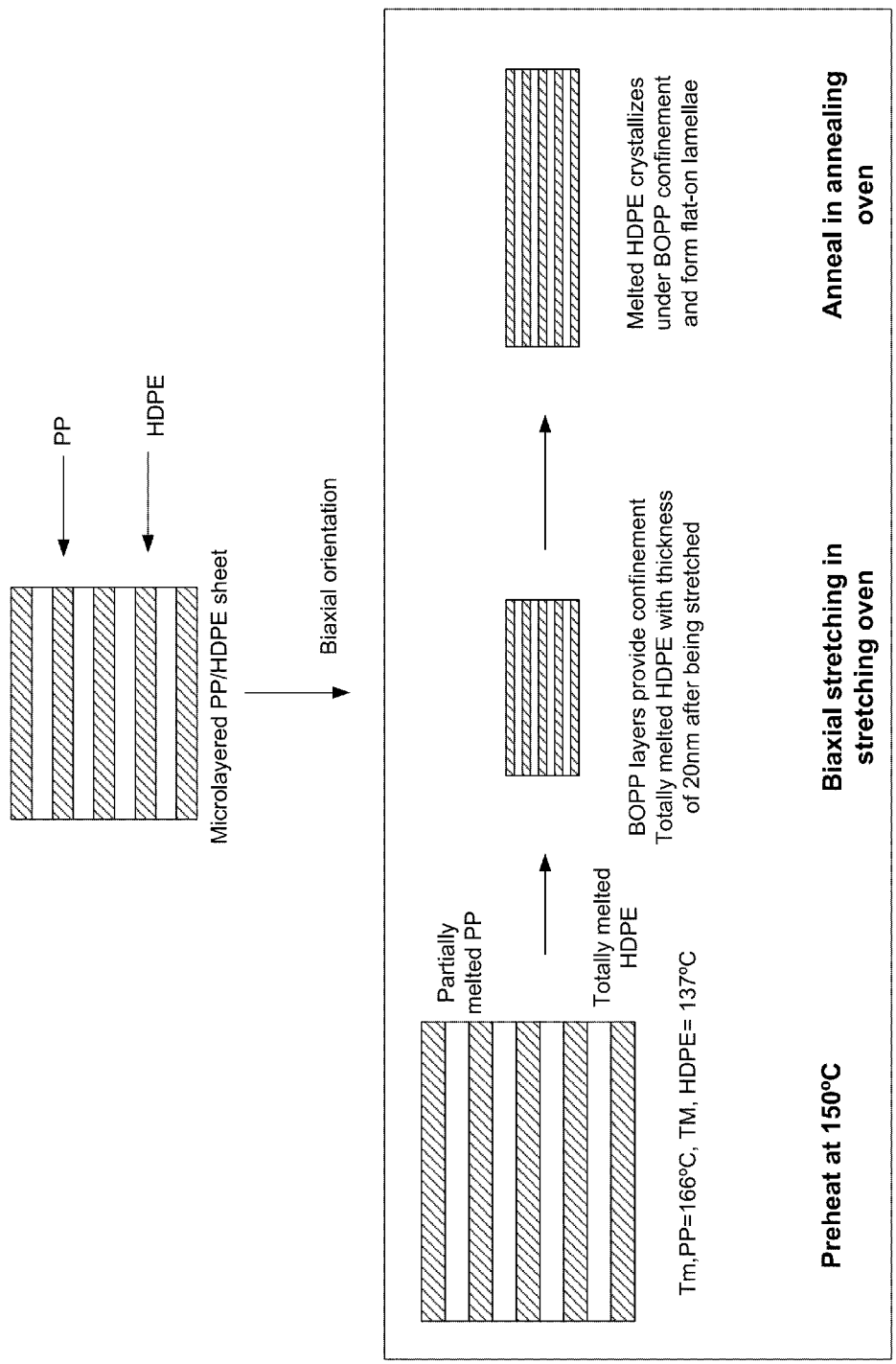
FIG. 2 is a schematic illustration of a method of forming an axially oxiented confined crystallization multilayer film.

FIG. 2 is a schematic illustration of a method of preparing a confined crystallization multilayer film in accordance with an aspect of the invention. The multilayer polymer film layer can be prepared by microlayer coextrusion of the two polymer materials. The first polymer material can include a first polymer that can be readily coextruded and form a substantially crystalline lamellae upon axial orientation to a reduced thickness. The second polymer material can include a second polymer material that can be readily coextruded with the first polymer material and confine layer of the first polymer material upon coextrusion.

Figure 3:
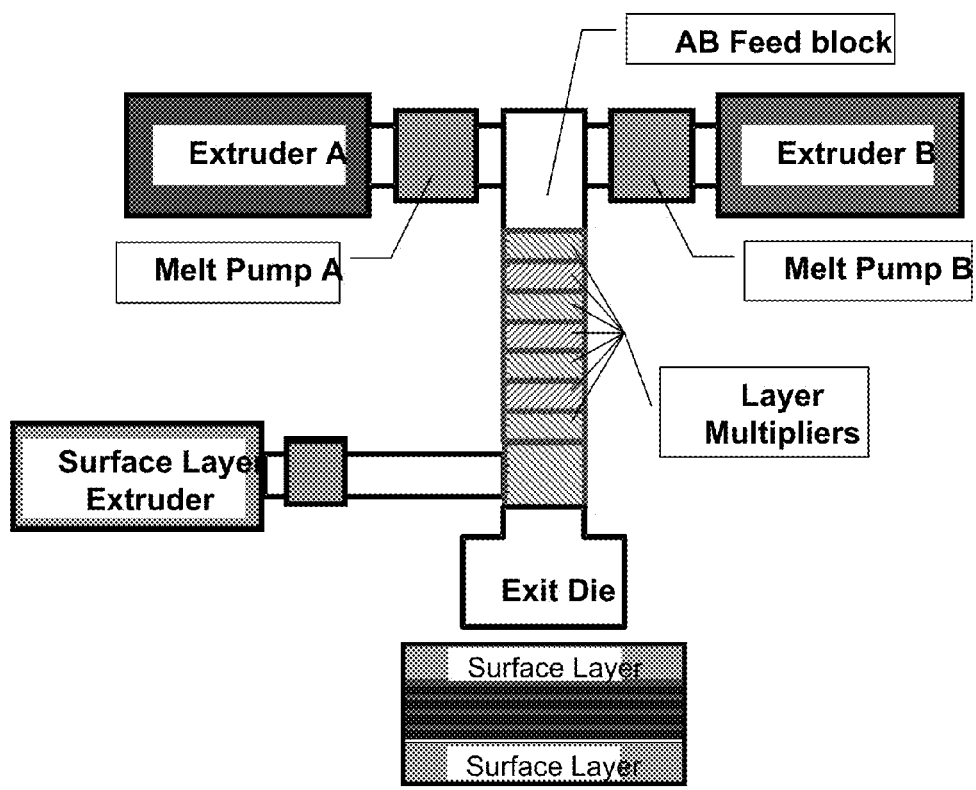
FIG. 3 is a schematic illustration of a layer-multiplying coextrusion process for forced-assembly of polymer nanolayers in accordance with an aspect of the application.
Figure 4:
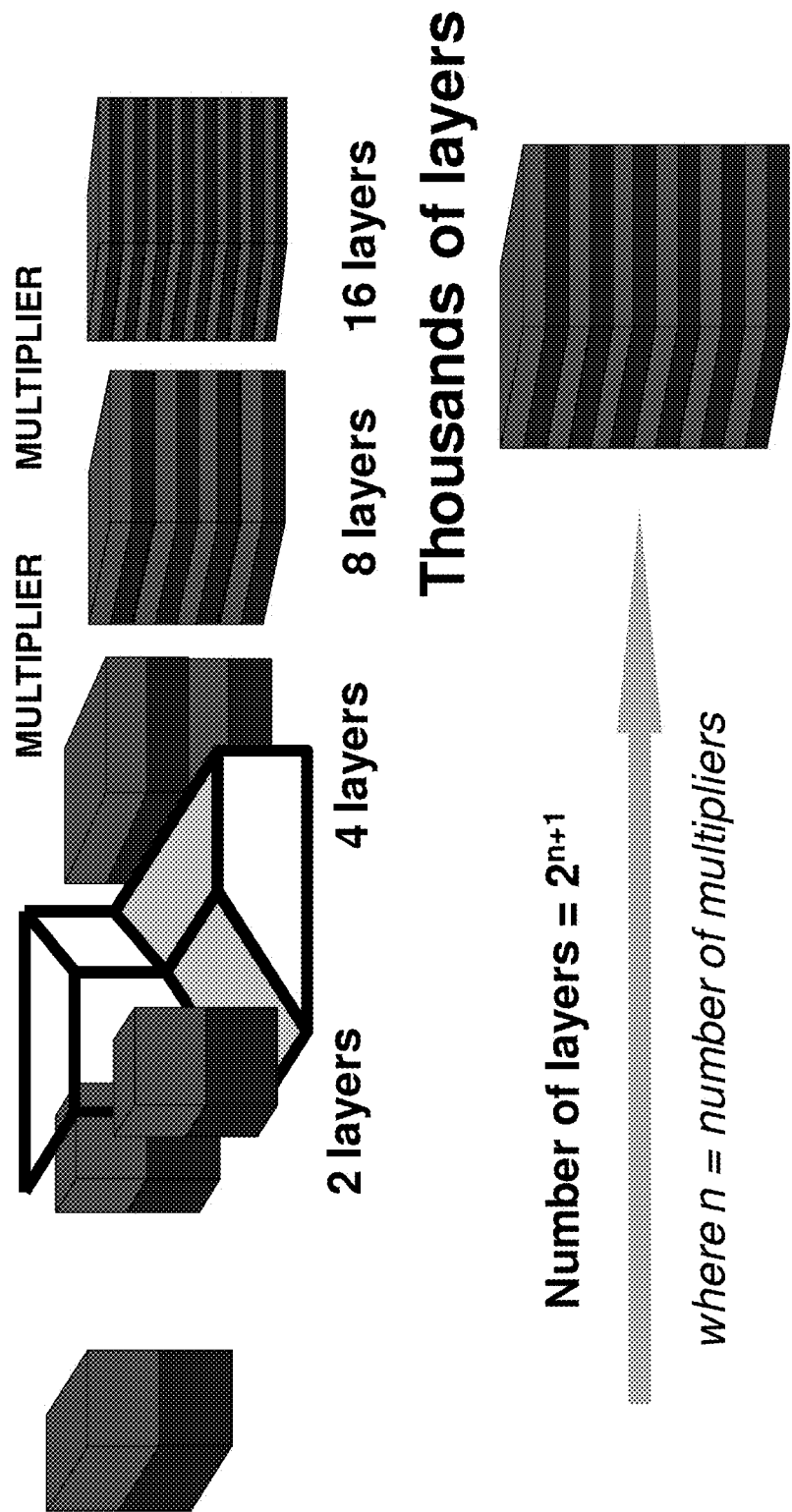
FIG. 4 is a schematic illustration of a layer-multiplying coextrusion for forced-assembly of polymer nanolayers in accordance with another aspect of the application.

A typical multilayer coextrusion apparatus is illustrated in FIGS. 3 and 4. The two component (AB) coextrusion system consists of two ¾ inch single screw extruders each connected by a melt pump to a coextrusion feedblock. The feedblock for this two component system combines polymeric material (a) and polymeric material (b) in an (AB) layer configuration. The melt pumps control the two melt streams that are combined in the feedblock as two parallel layers. By adjusting the melt pump speed, the relative layer thickness, that is, the ratio of A to B can be varied. From the feedblock, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence (AB)x where x is equal to (2)n and n is the number of multiplying elements. It is understood by those skilled in the art that the number of extruders used to fabricate the structure of the invention equals the number of components. Thus, a three-component multilayer (ABC . . . ), requires three extruders.

The multilayer film of the present invention preferably have at least 3 layers, for example, at least about 30 layers, 50 layers, 100 layers, or 1000 layers, including any number of layers within that range. In one example, the multilayer film of the present invention has from 50 to 1000 layers. In another example, the multilayer structure is in the form of film or sheet. By altering the relative flow rates or the number of layers, while keeping the film or sheet thickness constant, the individual layer thickness can be controlled. The multilayer film or sheet has an overall thickness ranging from 10 nanometers to 1000 mils, preferably from 0.1 mils to 125 mils and any increments therein.

Following formation of the multilayer film, the multilayer film can be axially oriented (e.g., biaxially drawn or stretched) at a temperature above the melting temperature ($T_m$) of the first polymer layer and below the melting temperature ($T_m$) of the second polymer layer and to a thickness such that each first polymer layer forms a high aspect ratio substantially crystalline lamellae. In one example, the multilayer film can be simultaneously and biaxially drawn to draw ratios varying from about 3:3 to about 5:5, although other draw ratios may be used.

Alternatively or optimally, the multilayer film can axially oriented (e.g., biaxially drawn or stretched) at a temperature at or below the melting temperature ($T_m$) of first polymer layers and between the glass transition temperature ($T_g$) and the cold crystallization temperature ($T_{cc}$) of the second polymer layers. The first polymer layers can then be melt recrystallized after axially orientation to reduce gas permeability of the multilayer film.

The confined crystallization multilayer film so formed can then be annealed if desired to form first polymer layers of flat-on substantially crystalline lamellae under confinement of the second layers. Further, the multilayer films may be formed into a number of articles by, for example, thermoforming, vacuum forming, or pressure forming. Further, through the use of forming dies, the multilayer films may be formed into a variety of useful shapes including profiles, tubes and the like.

The following examples are for the purpose of illustration only and are not intended to limit the scope of the claims, which are appended hereto.

EXAMPLE 1

In the present example, crystalline polyethylene oxide (PEO) (PolyOx WSR N-80) with Mw=200 kg/mol was coextruded with polypropylene (grade ZN5D98) with much lower crystallinity to form films of 65 alternating PP and PEO layers using a layer multiplying coextrusion process. The schematic drawing of layer-multiplying coextrusion in FIGS. 3 and 4 show how a series of n multiplying elements combines two dissimilar polymers as 2(n+1) alternating layers. With an ABA type of feedblock, an assembly of n die elements produces 2(n+1)+1 layers with polymer A layers on both outer sides of the film. The extruder, multipliers and die temperatures were set to 190° C. to ensure matching viscosities of the two polymer melts. The multilayered films with 65 alternating PP and PEO layers were coextruded as films of various composition ratios (vol/vol) including (PP/PEO) 95/5, 90/10, and 80/20.

The coextruded films were biaxially stretched in a Bruckner Karo IV biaxial stretcher at 147° C. The preheat time before stretching was fixed at 1 min. The films were simultaneously and equi-biaxially drawn to draw ratios varying from 3:3 to 5:5 (e.g., 4:4). The film were then cooled to room temperature.

The resulting nominal PEO layer thickness, which was calculated from the number of layers, the composition ratio, and the film thickness, varied from 25 μm to 8 nm. The films were stored in a desiccator to prevent moisture absorption. The size-scale effect on crystalline morphology and gas permeability were observed as the PEO layers were made thinner and the confinement by the PP layers approached the nanoscale.

Oxygen Permeability

Oxygen flux J(t) at 0% relative humidity, 1 atm and 23° C. was measured with a MOCON OX-TRAN 2/20. The permeant gas stream was diluted with nitrogen to achieve a 2% oxygen concentration in order to avoid exceeding the detector capability of the instrument. Permeability was obtained from the steady flux Jo according to $$P=J_o l/p \qquad (1)$$

where p is the oxygen pressure and l is the film thickness. Two films prepared under the same conditions were tested to obtain the average permeability. The permeability can be split into the solubility (S) and diffusivity (D). Usually D and S are extracted from the non-steady state flux curve.

Wide angle X-ray scattering (WAXS) measurements were performed using a Statton camera coupled to a Philips PW 1830 X-ray generator (Cu Kα radiation, λ=0.154 nm) operated at 30 kV and 35 mA. The collimated beam diameter was 250 μm. 2D WAXS images were collected using imaging plate and exposed imaging plates were read with a Fujifilm FDL5000 image plate reader. The sample-to-detector distance was 60 mm and the diffraction angle was calibrated using CaF2, standard. Several film pieces were stacked and glued with isocyanate 10s glue. The thickness of the stack was approximately 0.5 mm. The stack was exposed in three orthogonal directions. For directions in the plane of the film, the stack was sectioned perpendicular to the plane of the film to obtain the dimension of 1 mm in the X-ray beam direction.

Results

Using commercial instruments from Mocon (D. J. Sekelik, E. V. Stepanov, S, Nazarenko, D. Schiraldi, A. Hiltner, E. Baer, J. Polym. Sci. Pt. B-Polym. Phys. 37, 847-857 (1999)), the oxygen permeability (P) was measured on PEO films and biaxially stretched films with a 100% PP composition and with varying PP/PEO compositions of 95/5, 90/10, and 80/20. As shown below in the Table, surprisingly, the oxygen permeability substantially decreased for PP/PEO films compared to PEO films and PP biaxially stretched films.

TABLE 1

|  | Thickness of PEO layer (nm) | P(O$_2$) (Barrer) | P(O$_2$) of PEO layer (Barrer) |
|---|---|---|---|
| PEO |  | .38 |  |
| PP-4X4 | 0 | 0.80 ± 0.05 |  |
| PP/PEO-95/5-4X4 | 25 | 0.36 ± 0.01 | 0.031 |
| PP/PEO-90/10-4X4 | 50 | 0.21 ± 0.02 | 0.027 |
| PP/PEO-80/20-4X4 | 100 | 0.11 ± 0.01 | 0.025 |

Single Crystal Texture of Confined PEO Layers

Figure 5:
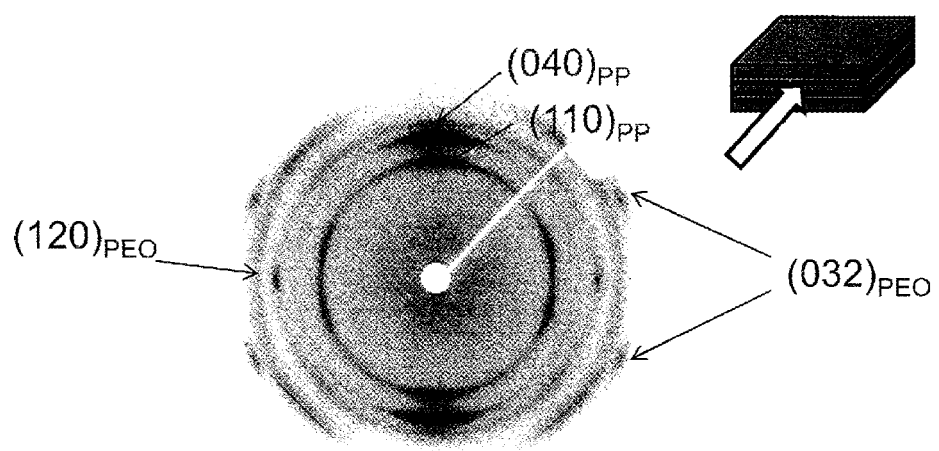
FIG. 5 illustrates the 2D WAXS patterns of a polypropylene (PP)/polyethylene oxide (PEO) multilayer film prepared in accordance with an aspect of the application.

Confirmation of the oriented lamellar morphology and details of the global orientation were obtained with wide angle X-ray scattering (WAXS). The PEO layers showed a very strong orientation of (120) and also (032) planes as seen in FIG. 5. Nearly all the (120) planes that contain macromolecular chains are perpendicular to the film plane. This means that the fold surfaces of the lamellar PEO crystals are parallel to the layer interfaces.

EXAMPLE 2

In the present example, polyvinylidene fluoride-polytetrafluoroethylene copolymer (PVDF-TFE) (VP-50, Di-CHEM) was coextruded with polyethylene terephthalate (PET) (Polyclear 1101, INVISTA) with much lower crystallinity to form films of 32 and 256 alternating PET and PVDF-TFE layers using a layer multiplying coextrusion process. The schematic drawing of layer-multiplying coextrusion in FIGS. 3 and 4 show how a series of n multiplying elements combines two dissimilar polymers as 2(n+1) alternating layers. With an ABA type of feedblock, an assembly of n die elements produces 2(n+1)+1 layers with polymer A layers on both outer sides of the film. The extruder, multipliers and die temperatures were set at 260° C. to ensure matching viscosities of the two polymer melts. The multilayered films with 32 alternating PET and PVDF-TFE layers were coextruded as films of composition ratios (vol/vol) including (PET/PVDF-TFE) 50/50 and 70/30.

The coextruded films were biaxially stretched in a Bruckner Karo IV biaxial stretcher at 105° C. The preheat time before stretching was less than 1 minute (e.g., 20 seconds). The stretch rate (% $s^{-1}$) was about 100. The films were simultaneously and equi-biaxially drawn to draw ratios varying from 3:3 to 5:5 (e.g., 4.5:4.5).

The melting temperatures of the PET and PVDF-TEF used were, respectively, 245° C. and 125° C. The stretch temperature was at or below the melting temperature ($T_m$) of the PVDF-TFE and between the glass transition temperature ($T_g$) (75° C.) and the cold crystallization temperature ($T_{cc}$) (125° C.) of PET., and the melting temperature of PVDF-TFE.

The film was then cooled to room temperature. Following cooling, the PVDF-TFE layers were melt recrystallized by heating the film to temperature of about 140° C. for 5 minutes to melt the PVDF-TFE. The PVDF-TFE layers were then recrystallized at 120° C. for three hours and allowed to slowly cool to room temperature.

The PVDF-TFE layer thickness, which was calculated from the number of layers, after biaxially stretching was about 10 nm to about 500 nm (e.g., nominal thickness about 290 nm). The PVDF-TFE layer thickness after melt recrystallization was slightly less than the thickness of the film after biaxially stretching, e.g., about 10 nm to about 50 nm less (nominal thickness of about 275 nm). The films were stored in a desiccator to prevent moisture absorption. The size-scale effect on crystalline morphology and gas permeability were observed as the PVDF-TFE layers were made thinner and the confinement by the PET layers approached the nanoscale.

Oxygen Permeability

Oxygen flux J(t) at 0% relative humidity, 1 atm and 23° C. was measured with a MOCON OX-TRAN 2/20. The permeant gas stream was diluted with nitrogen to achieve a 2% oxygen concentration in order to avoid exceeding the detector capability of the instrument. Permeability was obtained from the steady flux Jo according to $$P = J_o l/p \quad (1)$$

where p is the oxygen pressure and l is the film thickness. Two films prepared under the same conditions were tested to obtain the average permeability. The permeability can be split into the solubility (S) and diffusivity (D). Usually D and S are extracted from the non-steady state flux curve.

Wide angle X-ray scattering (WAXS) measurements were performed using a Statton camera coupled to a Philips PW 1830 X-ray generator (Cu Kα radiation, λ=0.154 nm) operated at 30 kV and 35 mA. The collimated beam diameter was 250 μm. 2D WAXS images were collected using imaging plate and exposed imaging plates were read with a Fujifilm FDL5000 image plate reader. The sample-to-detector distance was 60 mm and the diffraction angle was calibrated using CaF2, standard. Several film pieces were stacked and glued with isocyanate 10s glue. The thickness of the stack was approximately 0.5 mm. The stack was exposed in three orthogonal directions. For directions in the plane of the film, the stack was sectioned perpendicular to the plane of the film to obtain the dimension of 1 mm in the X-ray beam direction.

Results

Using commercial instruments from Mocon (D. J. Sekelik, E. V. Stepanov, S, Nazarenko, D. Schiraldi, A. Hiltner, E. Baer, J. Polym. Sci. Pt. B-Polym. Phys. 37, 847-857 (1999)), the oxygen permeability (P) was measured on PET/PVDF films as extruded, biaxially stretched, and melt recrystallized. As shown below in the Table 2, surprisingly, the oxygen permeability substantially decreased for PET/PVDF-TFE films compared to PET films PVDF-TFE extruded films. Additionally, it was unexpectedly found that the biaxially stretched PET/PVDF-TFE film that were further melt recrystallized had a substantially lower oxygen permeability compared to biaxially stretched PET/PVDF-TFE films.

TABLE 2

| Sample | Treatment | Layer Thickness (nm) | Overall Film $O_2$ Permeability (Barrer) |
|---|---|---|---|
| PVDF-TFE Control | As Extruded | — | 0.204 ± 0.012 |
| PET Control | As Extruded | — | 0.0591 ± 0.0017 |
|  | Biax Stretched | — | 0.0369 ± 0.0007 |
|  | Recrystallized | — | 0.0343 ± 0.0005 |
| 50/50 PET/PVDF-TFE | As Extruded | 300 | 0.0888 ± 0.0021 |
|  |  | 40 | 0.0934 ± 0.0017 |
|  | Biax Stretched | 300 | 0.0572 ± 0.0014 |
|  |  | 40 | 0.0498 ± 0.0024 |
|  | Recrystallized | 300 | 0.00903 ± 0.0071 |
|  |  | 40 | 0.00106 ± 0.00033 |

Using commercial instruments from Mocon, the water permeability was also measured on PET/PVDF films as extruded, biaxially stretched, and melt recrystallized. As shown below in the Table 3, surprisingly, the biaxially stretched PET/PVDF-TFE film that were further melt recrystallized had a substantially lower water permeability compared to biaxially stretched PET/PVDF-TFE films.

TABLE 3

| Sample | Treatment | Layer Thickness (nm) | Overall Film $H_2O$ Permeability (gm-mil/100 $inch^2$-day) |
|---|---|---|---|
| 50/50 PET/PVDF-TFE 32 Layers | As Extruded | 300 | 4.07 ± 0.29 |
|  | Biax Stretched | 300 | 3.10 ± 0.12 |
|  | Recrystallized | 300 | 0.0902 ± 0.0047 |
| 70/30 PET/PVDF-FE 256 Layers | As Extruded | 20 | 3.79 ± 0.075 |
|  | Biax Stretched | 20 | 3.62 ± 0.048 |
|  | Recrystallized | 20 | 0.0344 ± 0.00044 |

Single Crystal Texture of Confined PVDF-TFE Layers

Figure 6:
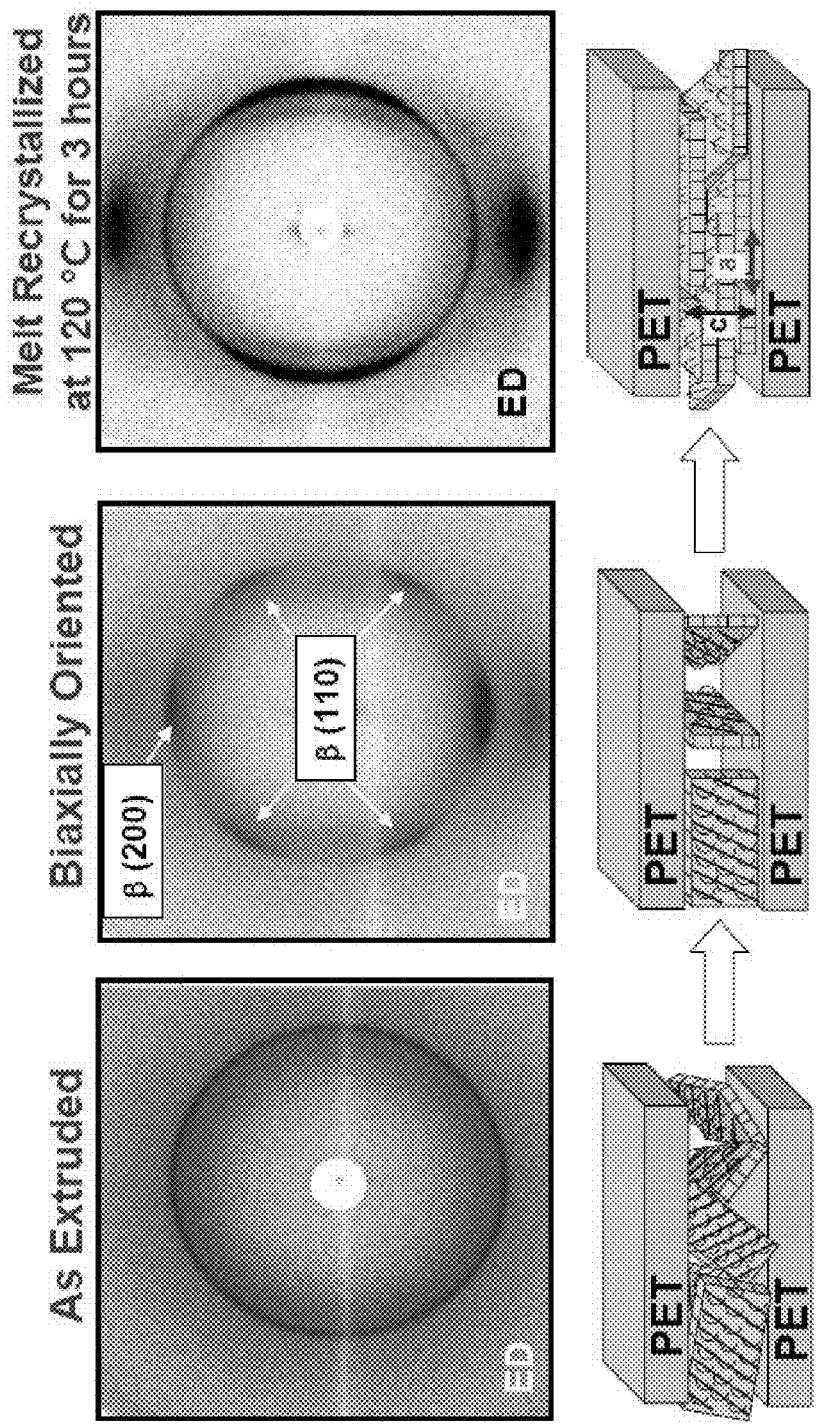
FIG. 6 illustrates the 2D WAXS patterns of a polyethylene terephthalate (PET)/polyvinylidene fluoride-polytetrafluoroethylene (PVDF-TFE)(PET/PVDF-TEF) multilayer film prepared in accordance with another aspect of the application.

Confirmation of the oriented lamellar morphology and details of the global orientation were obtained with wide angle X-ray scattering (WAXS). The PVDF-TFE layers showed a very strong orientation as seen in FIG. 6. For the melt recrystallized film, nearly all the planes that contain macromolecular chains are perpendicular to the film plane. This means that the fold surfaces of the lamellar PVDF-TFE crystals are parallel to the layer interfaces.

While a preferred embodiment of the invention has been illustrated and described, it shall be understood that the invention is not limited to this embodiment. Numerous modifications, changes and variations will be obvious for those skilled in the art, without departing from the scope of the invention as described by the appended claims. All patents, publications, and references cited herein are incorporated by reference in their entirety.

Having described the invention, the following is claimed:

1. A method of forming a confined crystallization multilayer film, the method comprising:
   providing a multilayer film that includes a plurality of first polymer layers and a plurality of second polymer layers wherein each first polymer layer is sandwiched between second polymer layers, the first polymer layers having a melting temperature ($T_m$) below the melting temperature ($T_m$) of the second polymer layers; and
   axially orienting the multilayer film at a temperature below the melting temperature ($T_m$) of the second polymer layers and to a thickness such that each first polymer layer forms a high aspect ratio substantially crystalline lamellae, the multilayer film being substantially impermeable to gas diffusion.

2. The method of claim 1, wherein the first polymer layers and the second polymer layers are coextruded to form the multilayer film.

3. The method of claim 1, the multilayer film being biaxially oriented after coextrusion.

4. The method of claim 1, the first polymer layers comprising a first polymer selected from the group consisting of high-density polyethylene, polyethylene oxide, polyamide, polyester, polycaprolactone, polyvinylidene fluoride, polytetrafluoroethylene, polyvinylidene, copolymers thereof, and combinations thereof.

5. The method of claim 1, the second polymer layers comprising a second polymer selected from the group consisting of polypropylene, polystyrene, maleic anhydride-modified polypropylene (PPgMA), PET, polycarbonate, acrylics/methacrylics, polyesters, polyurethanes, polyamides, polyimides, polyphosphazenes, epoxy resins, hybrid polyester polymers, nylon, low-density polyethylene, polyoxymethylene, copolymers thereof, and combinations thereof.

6. The method of claim 1, the first polymer layers after axial orientation having an average thickness of about 10 nm to about 500 nm.

7. The method of claim 1, the aspect ratio of the substantially crystalline lamellae being at least about 5.

8. The method of claim 1, the second polymer layers being immiscible or partially miscible with the first polymer layers.

9. The method of claim 1, wherein the multilayer film is drawn at a draw ratio of about 3:3 to about 5:5.

10. The method of claim 1, wherein the multilayer film is axially oriented at a temperature above the melting temperature ($T_m$) of the first polymer layers and below the melting temperature ($T_m$) of the second polymer layers and to a thickness such that each first polymer layer forms a high aspect ratio substantially crystalline lamellae.

11. The method of claim 1, wherein the multilayer film is axially oriented at a temperature at or below the melting temperature ($T_m$) of first polymer layers and between the glass transition temperature ($T_g$) and the cold crystallization temperature ($T_{cc}$) of the second polymer layers.

12. The method of claim 11, wherein the first polymer layers are melt recrystallized after axial orientation to reduce gas permeability of the multilayer film.

13. A method of forming a confined crystallization multilayer film, the method comprising:
   providing a multilayer film that includes a plurality of first polymer layers and a plurality of second polymer layers wherein each first polymer layer is sandwiched between second polymer layers, the first polymer layers having a melting temperature ($T_m$) below the melting temperature ($T_m$) of the second polymer layers; and
   axially orienting the multilayer film at a temperature above the melting temperature ($T_m$) of the first polymer layers and below the melting temperature ($T_m$) of the second polymer layers and to a thickness such that each first polymer layer forms a high aspect ratio substantially crystalline lamellae, the multilayer film being substantially impermeable to gas diffusion.

14. The method of claim 13, wherein the first polymer layers and the second polymer layers are coextruded to form the multilayer film.

15. The method of claim 13, the multilayer film being biaxially oriented after coextrusion at a draw ratio of about 3:3 to about 5:5, the first polymer layers after biaxial orientation having an average thickness of about 10 nm to about 500 nm.

16. The method of claim 13, the substantially crystalline lamellae extending in a plane substantially parallel to the multilayer film and the aspect ratio of the substantially crystalline lamellae being at least about 5.

17. The method of claim 13, the second polymer layers being immiscible or partially miscible with the first polymer layers.

18. The method of claim 17, the first polymer layers comprising a first polymer selected from the group consisting of high-density polyethylene, polyethylene oxide, polyamide, polyester, polycaprolactone, polyvinylidene fluoride, polytetrafluoroethylene, polyvinylidene, copolymers thereof, and combinations thereof.

19. The method of claim 17, the second polymer layers comprising a second polymer selected from the group consisting of polypropylene, polystyrene, maleic anhydride-modified polypropylene (PPgMA), PET, polycarbonate, acrylics/methacrylics, polyesters, polyurethanes, polyamides, polyimides, polyphosphazenes, epoxy resins, hybrid polyester polymers, nylon, low-density polyethylene, polyoxymethylene, copolymers thereof, and combinations thereof.

20. A method of forming a confined crystallization multilayer film, the method comprising:
   providing a multilayer film that includes a plurality of first polymer layers and a plurality of second polymer layers wherein each first polymer layer is sandwiched between second polymer layers, the first polymer layers having a melting temperature ($T_m$) below the melting temperature ($T_m$) of the second polymer layers; and
   axially orienting the multilayer film at a temperature at or below the melting temperature ($T_m$) of the first polymer layers and between the glass transition temperature ($T_g$) and the cold crystallization temperature ($T_{cc}$) of the second polymer layers to a thickness such that each first polymer layer forms a high aspect ratio substantially crystalline lamellae, the multilayer film being substantially impermeable to gas diffusion.

21. The method of claim 20, wherein the first polymer layers are melt recrystallized after axial orientation to reduce gas permeability of the multilayer film.

22. The method of claim 21, wherein the first polymer layers and the second polymer layers are coextruded to form the multilayer film.

23. The method of claim 21, the multilayer film being biaxially oriented after coextrusion at a draw ratio of about 3:3 to about 5:5, the first polymer layers after biaxial orientation having an average thickness of about 10 nm to about 500 nm.

24. The method of claim 21, the substantially crystalline lamellae extending in a plane substantially parallel to the multilayer film and the aspect ratio of the substantially crystalline lamellae being at least about 5.

25. The method of claim 21, the second polymer layers being immiscible or partially miscible with the first polymer layers.

26. The method of claim 25, the first polymer layers comprising a first polymer selected from the group consisting of high-density polyethylene, polyethylene oxide, polyamide, polyester, polycaprolactone, polyvinylidene fluoride, polytetrafluoroethylene, polyvinylidene, copolymers thereof, and combinations thereof.

27. The method of claim 25, the second polymer layers comprising a second polymer selected from the group consisting of polypropylene, polystyrene, maleic anhydride-modified polypropylene (PPgMA), PET, polycarbonate, acrylics/methacrylics, polyesters, polyurethanes, polyamides, polyimides, polyphosphazenes, epoxy resins, hybrid polyester polymers, nylon, low-density polyethylene, polyoxymethylene, copolymers thereof, and combinations thereof.

28. The method of claim 1, the first polymer layers comprising polyethylene oxide (PEO) and the second polymer layers comprising polypropylene.

29. The method of claim 1, the first polymer layers comprising polyvinylidene fluoride-polytetrafluoroethylene (PVDF-TFE) and the second polymer layers comprising PET.

30. The method of claim 13, the first polymer layers comprising polyethylene oxide (PEO) and the second polymer layers comprising polypropylene.

31. The method of claim 13, the first polymer layers comprising PVDF-TFE and the second polymer layers comprising PET.

32. The method of claim 20, the first polymer layers comprising PEO and the second polymer layers comprising polypropylene.

33. The method of claim 20, the first polymer layers comprising PVDF-TFE and the second polymer layers comprising PET.

* * * * *